W. CORNWALL, Jr., & A. W. CORNWALL.
Process and Apparatus for Remelting Soap.
No. 228,321. Patented June 1, 1880.
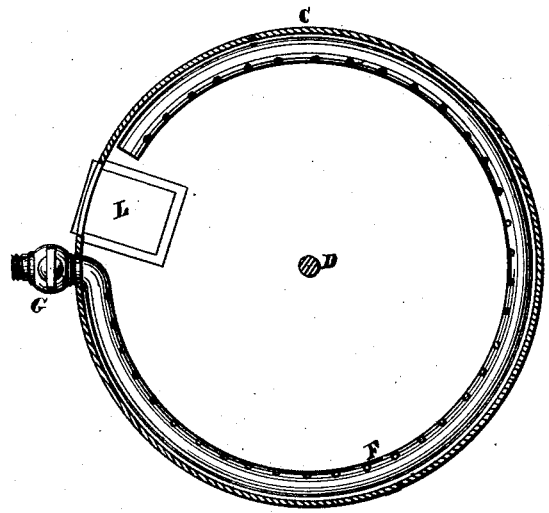
Fig. 2
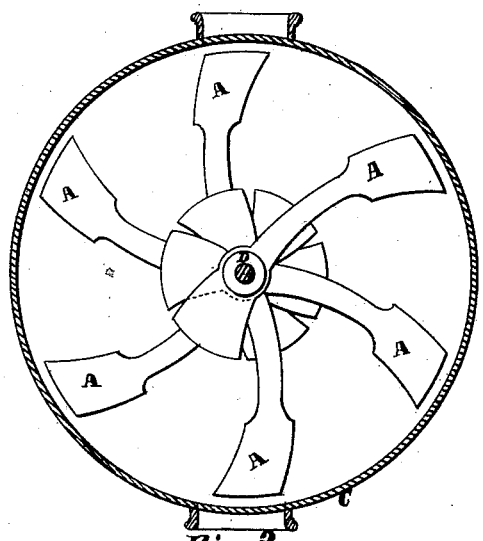
Fig. 3
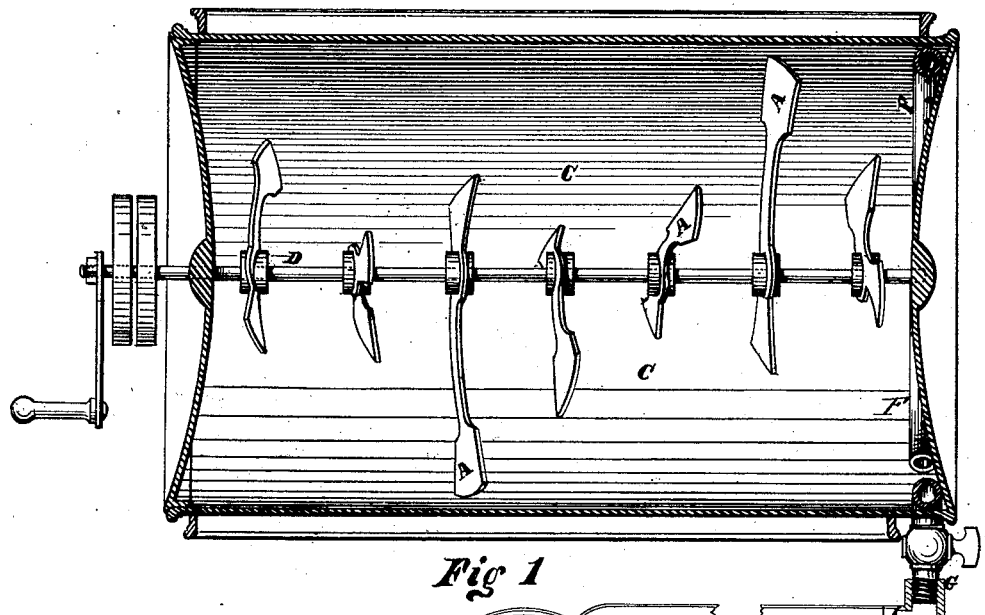
Fig. 1
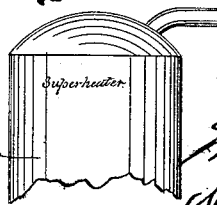
Witnesses
Inventor

United States Patent Office.

WILLIAM CORNWALL, JR., AND AARON W. CORNWALL, OF LOUISVILLE, KY.

PROCESS AND APPARATUS FOR REMELTING SOAP.

SPECIFICATION forming part of Letters Patent No. 228,321, dated June 1, 1880.

Application filed August 23, 1879.

*To all whom it may concern:*

Be it known that we, WILLIAM CORNWALL, Jr., and AARON W. CORNWALL, of Louisville, in the county of Jefferson and State of Kentucky, have invented a new and Improved Process and Apparatus for Remelting Soap; and we do hereby declare that the following is a full, clear, and exact description of the same.

Our invention relates to an improved process of remelting scrap-soap or broken soap for the purpose of making it into soap of marketable form and quality.

The said process consists in subjecting the scrap or pieces of soap to the action of dry superheated steam.

The mass of scrap is agitated or stirred by revolving arms, while the steam is allowed to enter it at the bottom of the tank or vessel in which it is contained.

We show in accompanying drawings a suitable apparatus for carrying out our process.

Figures 1, 2, 3 are, respectively, a longitudinal vertical section and vertical cross-sections of such apparatus.

The scrap or broken soap is placed in the vessel C, and dry superheated steam admitted through pipe F, which is provided with a stop-cock, G, and with perforations for the purpose of allowing escape of steam therefrom along its whole length. Said pipe has a circular or ring form, and is placed concentrically with the periphery of the vessel C, at one end of the same. Said pipe is connected with a steam-superheater, as shown in Fig. 1.

The dry superheated steam escapes from pipe F into the mass of broken soap in vessel C, and gradually but quickly softens and melts the same.

The arms A, fixed on and revolving with the central longitudinal shaft, D, agitate, break up, and mix the pieces of soap and facilitate the action of the dry steam on all portions of the same, so that the scrap is quickly reduced to a pasty mass of uniform or homogeneous quality and consistency. The mass is then drawn off from the cylinder C through an outlet having a sliding door, L.

We are aware that superheated steam has been employed for rendering raw fat, for combining the materials of soap, and for melting rosin and tallow.

The desired action or effect of the steam on the scrap is not dependent on the degree of pressure. In other words, the pressure may be high without producing the result aimed at, the essential thing being that the steam shall be both superheated and dry.

The chief object is to avoid the condensation of steam in the soap. If, for illustration, a heat of 400° Fahrenheit were required to melt soap, this heat could be secured by ordinary free or low steam at a pressure of about two hundred and fifty pounds per inch; but such steam at such pressure would, nevertheless, all be condensed in the soap, so that the latter would be too wet to frame in a mold. The soap would also be expanded and left full of holes in a spongy and unsalable condition. The process would thus be a failure and involve a loss, since the moisture would have to be evaporated, which, aside from labor and time required, will drive off any perfume the soap may contain; but if steam, superheated and dry, however low the pressure, be employed, the soap will be quickly melted without becoming moist by condensation, and may hence be at once framed in molds.

To repeat, any degree of heat that may be obtained with ordinary steam will not answer the purpose, since the soap will be wet, and thereby injured, &c., whereas, if the steam be dry (superheated) it will subserve the purpose, even at low pressure, as we have fully demonstrated by experiment.

What we claim is—

1. The process of remelting scrap-soap or broken soap, which consists in subjecting it to the action of dry superheated steam, as set forth.

2. The improved apparatus for use in remelting scrap-soap or broken soap, the same consisting of the combination of a superheater with the vessel C, the latter having the outlet L and the perforated pipe F, for admitting superheated steam, and the horizontal rotating shaft, having arms A, for agitating and mixing the soap, as shown and described.

WM. CORNWALL, JR.
A. W. CORNWALL.

Witnesses:
A. Y. JOHNSON, Jr.,
JOHN SULLIVAN.